United States Patent [19]

Schäpel et al.

[11] 4,129,697
[45] Dec. 12, 1978

[54] PROCESS FOR THE PRODUCTION OF THERMOFORMABLE POLYISOCYANURATE FOAMS

[75] Inventors: Dietmar Schäpel, Cologne; Ulrich von Gizycki, Leverkusen, both of Germany

[73] Assignee: Bayer Aktiengesellschaft, Leverkusen, Germany

[21] Appl. No.: 765,490

[22] Filed: Feb. 4, 1977

[30] Foreign Application Priority Data

Feb. 24, 1976 [DE] Fed. Rep. of Germany ....... 2607380

[51] Int. Cl.² .................... C08G 18/14; C08G 18/76; C08G 18/65
[52] U.S. Cl. ................................ 521/176; 428/425; 521/160; 521/129; 521/902
[58] Field of Search ................... 260/2.5 AP, 2.5 AT, 260/2.5 AW, 77.5 AT, 453 AM

[56] References Cited

U.S. PATENT DOCUMENTS

| | | | |
|---|---|---|---|
| 3,644,232 | 2/1972 | Bernard et al. | 260/2.5 AT |
| 3,676,380 | 7/1972 | McLaughlin et al. | 260/2.5 AW |
| 3,745,133 | 7/1973 | Comunale et al. | 260/2.5 AW |
| 3,836,424 | 9/1974 | Reymore et al. | 260/2.5 AW |
| 3,857,800 | 12/1974 | Fishbein et al. | 260/2.5 AP |
| 3,865,762 | 2/1975 | Repiquet et al. | 260/2.5 AP |
| 4,009,130 | 2/1977 | Zimmerman et al. | 260/2.5 AW |

*Primary Examiner*—H.S. Cockeram
*Attorney, Agent, or Firm*—Gene Harsh; Joseph C. Gil; R. Brent Olson

[57] ABSTRACT

The invention relates to thermoformable polyisocyanurate foams which are produced by reacting a polymethylene polyphenyl polyisocyanate having a specified diisocyanate content with polyethers which have an OH number between 28 and 112 and dihydric alcohols which have a molecular weight between 62 and 200 in the presence of isocyanate trimerization catalysts, blowing agents and other foaming agents.

5 Claims, No Drawings

PROCESS FOR THE PRODUCTION OF THERMOFORMABLE POLYISOCYANURATE FOAMS

BACKGROUND OF THE INVENTION

Rigid foams having polyisocyanurate structures are known. They are highly cross-linked polymers and therefore have high compressive strength, high temperature resistance and high dimensional stability to heat. They also have excellent flame-resistant properties. The possible uses of polyisocyanurate foams therefore lie primarily in the field of thermal insulation. When provided with facings, they may also be used in the building industry as structural elements.

The production of polyisocyanurate foams is known and has been described, for example, in German Pat. No. 1,112,285 and in British Pat. No. 1,104,394, and may be carried out, for example, by reacting organic polyisocyanates with known trimerization catalysts in the presence of materials, such as foam stabilizers and blowing agents, and, optionally, polyols. The polyisocyanate used is frequently crude diisocyanatodiphenylmethane of the type obtained from a commercial phosgenation of crude diaminodiphenylmethane (see, e.g. British Pat. No. 1,146,661 and 1,184,893).

The wide field of application potentially available to these foams by virtue of their high temperature resistance combined with high flame resistant properties is, however, severely restricted by their brittleness. Attempts have therefore been made to reduce this brittleness.

In British Pat. No. 1,318,925, for example, it has been proposed to achieve this object by using polyester polyols within a preferred molecular weight range of from 1500 to 3000. The use of an increased proportion of polyfunctional propylene oxide polyethers has also been investigated, for example, by Frisch et al in Journal of Cellular Plastics, Sequence 1, Number 6 (1970), pages 203-214. In U.S. Pat. No. 3,849,349, the simultaneous use of higher functional polyols having a preferred molecular weight range of from 100 to 300 and epoxides has been proposed.

In another process for reducing the brittleness of polyisocyanurate foams it was proposed to use prepolymers having isocyanate end groups obtained from trifunctional polyesters and tolylene diisocyanate, such as the prepolymers described by Nicholas and Gmitter in Journal of Cellular Plastics, Volume 1, Number 1 (1965), page 85, and the prepolymers described in U.S. Pat. No. 2,979,485 and 2,993,870 and in German Offenlegungsschrift 2,024,344. However, the foams obtainable by this type of process (for example, those described in German Offenlegungsschrift No. 1,745,177) were and are still regarded as too brittle for practical use.

Yet another process has been proposed according to which branched polyols which have hydroxyl numbers within the preferred range of from 400 to 600 and (commercially) pure diisocyanatodiphenylmethane are reacted together in proportions, by weight, of less than 0.5. Various examples of the advantageous use of a higher proportion of difunctional isocyanates for the production of polyisocyanurate foams have also been given in German Offenlegungsschriften No. 1,966,261 and No. 1,769,023.

Since the combination of high dimensional stability to heat with high non-inflammability is highly desirable, these known methods for producing polyisocyanurate foams, while achieving a certain reduction in brittleness, do so only to the extent that the foams are not destroyed in transport or when installed or exposed to the usual mechanical influences in use. These polyisocyanurate foams, even though less brittle, must therefore still be classified as brittle, rigid foams.

Additionally, it has not hitherto been known to produce polyisocyanurate foams which are thermoformable. The process of thermoforming flexible and semirigid polyurethane foams is known and has been extended to rigid foams, for example according to the teaching given in German Gebrauchsmuster No. 7,220,186. These foams are preferably produced from difunctional polyols having hydroxyl numbers within the range of from 150 to 300 by reaction with polyisocyanates and may contain a proportion of isocyanurate structures. The index is within the conventional range for rigid polyurethane foams (from 100 to 110). Even this process gives no guidance as to how systems which have higher indices can be converted into thermoformable polyisocyanurate foams by trimerization of excess polyisocyanate.

In view of the convenience and advantages of the thermoforming process, there has long been a desire to produce rigid foams which would combine the advantageous properties of polyisocyanurate foams with the capacity for being thermoformed. Such foams have not hitherto been known.

DESCRIPTION OF THE INVENTION

It has now surprisingly been found that it is possible to produce polyisocyanurate foams which are both dimensionally stable to heat and capable of being thermoformed. By reacting particular polyisocyanates, i.e., polymethylene polyphenyl polyisocyanates containing at least 80% by weight, of difunctional components, with particular polyhydroxypolyethers in which at least 20% by weight, preferably from 30 to 50% by weight, of the alkylene oxide component consists of ethylene oxide, it is possible to obtain rigid polyisocyanurate foams which, as well as having a high dimensional stability to heat, are so exceptionally tough that they are well suited to being thermoformed.

This finding was not suggested or expected from the known state of the art. The polymers in question are rigid foams and three-dimensionally cross-linked through isocyanurate structures. Thus, it could not be expected from the polyisocyanurate foams already described in the literature, that polyisocyanurates can be used as a basis for the production of thermoformable foams. On the contrary, those skilled in the art would naturally have expected such materials to be completely unsuitable for the synthesis of thermoformable polymers. Furthermore, the process according to the present invention is easily carried out so that the conventional high speed mixing machines generally used for mixing the dispersing reaction mixtures for polyurethane foams may be employed. The present invention therefore greatly increases the scope of application of polyisocyanurate foams.

The present invention therefore relates to a process for the production of thermoformable polyisocyanurate foams by reaction of compounds having hydroxyl groups with an excess of polyisocyanates in the preence of isocyanate trimerization catalysts, blowing agents and optionally other foaming agents. The process is characterized in that the polyisocyanate used is a polymethylene polyphenyl polyisocyanate containing at least 80% by weight, of diisocyanatodiphenylmethane. Additionally, the hydroxyl compounds used consist of a mixture comprising:
  (a) polyethers having an OH number of from 28 to 112 which have at least one hydroxyl group and in which at least 20% by weight, preferably from 30 to 50% by weight, of the alkylene oxide component consists of ethylene oxide residues, and
  (b) dihydricalcohols having a molecular weight of from 62 to 200.

The polyethers which have at least one hydroxyl group are used in a quantity of from 0.015 to 0.04 equivalents of OH and the dihydricalcohol in a quantity of from 0.2 to 0.4 equivalents of OH per equivalent of NCO.

The present invention also relates to thermoformable polyisocyanurate foams obtained by the process according to the present invention.

The process according to the present invention is carried out by known procedures, for example, as described in Saunders and Frisch, Polyurethanes, Chemistry and Technology, Part II (1964), publishers Interscience New York, and Rigid Plastics Foams (1963) by T. H. Ferrigno, pages 51 to 61, Reinhold Publishing Corporation New York. It is preferable to employ a one-shot process in which the polyisocyanate (Component A) is mixed with a blowing agent which is inert towards isocyanate groups and the mixture is then reacted with the polyol (Component B) which contains catalysts and, optionally, surface-active substances, fillers, dyes, flameretarding agents and similar additives of the type commonly used in this field.

The starting components for the process according to the present invention are known.

The polyisocyanate (Component A) is a polymethylene polyphenylpolyisocyanate which contains at least 80% by weight, of diisocyanatodiphenylmethane. The remainder of the material consists of the related polyisocyanates having a higher molecular weight and higher functionality.

Compounds which may be used as polyisocyanates include polymethylene polyphenylpolyisocyanates which have a diisocyanatodiphenylmethane content within the range indicated above. They may be obtained by the known method of phosgenating polyphenylpolymethylenepolyamines. The polyamines may be obtained by the known process of condensation of aromatic amines with aniline, o-chloroaniline, o-toluidine and formladehyde. The useful polyisocyanates also include pure diphenylmethane diisocyanate in the form of its known isomers and isomer mixtures, and "modified" polyisocyanates which have a diisocyanatodiphenylmethane content within the above range and are obtained by chemical modification of diisocyanatodiphenylmethane.

These modified diisocyanatodiphenylmethanes include diisocyanatodiphenylmethane, both the 4,4'-isomer and mixtures of 4,4'-isomer with the 2,4'-isomer and/or 2,2'-isomer, which have been treated to convert a minor proportion of the starting material, amounting to less than 20% by weight into a urethane containing isocyanate. The polymethylene polyphenylpolyisocyanate used may be, for example, a diisocyanatodiphenylmethane which has been converted into a stable liquid at temperatures of about 20° C. (diisocyanatodiphenylmethane is normally a solid at room temperature, having a melting point of from about 35 to 42° C.) by heating it to about 80° C. for 3 hours in the presence of, for example, from 10 to 15% by weight, of a glycol, such as tripropylene glycol. Preparation of these modified diisocyanatodiphenylmethanes may be carried out, for example, by the procedures described in U.S. Pat. No. 3,644,457.

Other modified diisocyanatodiphenylmethanes suitable for use according to the present invention may be obtained, for example, by treating diisocyanatodiphenylmethane (e.g. the pure 4,4'-isomer and mixtures thereof with 2,4' or 2,2'-isomer) with a minor proportion of a carbodiimide, for example in accordance with the procedure described in British Pat. No. 918,454 or as described in German Pat. No. 1,092,007. A minor proportion of the diisocyanatodiphenylmethane is thereby converted into the corresponding isocyanato-substituted carbodiimide, and a mixture consisting of a major portion of unchanged starting material and a minor portion of this isocyanatosubstituted carbodiimide is obtained.

Particularly preferred as polyisocyanates are those polymethylene polyphenylpolyisocyanates which contain from 5 to 60% of 2,4'-diisocyanatodiphenylmethane.

The starting materials used according to the present invention include (as Component B) polyethers which contain at least one, generally from 2 to 4 and preferably 2 or 3 hydroxyl groups. In these polyethers at least 20% by weight, preferably from 30 to 50% by weight, of the alkylene oxide component consists of ethylene oxide groups. Preferably at least 10% by weight of the hydroxyl groups are primary hydroxyl groups. These polyethers have an OH number of from 28 to 112, and preferably from 36 to 56. They may be prepared, for example, by polymerizing an epoxide, such a ethylene oxide, propylene oxide, butylene oxide, tetrahydrofuran, styrene oxide or epichlorohydrin, e.g. in the presence of $BF_3$. Alternatively, they may be obtained by chemical addition of these epoxides, either as mixtures or successively, to starting components having reactive hydrogen atoms, such as water, alcohols, or amines. Suitable starting components include, ethanol, n-butanol, ethylene glycol, propylene glycol-(1,3) or -(1,2), trimethylolpropane, 4,4'-dihydroxy-diphenylpropane, aniline, ammonia, ethanolamine, ethylene diamine and the like. If obtained by chemical addition, at least part of the epoxide added at the end of the reaction should be ethylene oxide. Polyethers which have been modified with vinyl polymers are also suitable. For example, the compounds obtained by polymerization of styrene or acrylonitrile in the presence of polyethers may be used (U.S. Pat. Nos. 3,383,351; 3,304,273; 3,523,093 and 3,110,695 and German Pat. No. 1,152,536). These polyethers may be used either singly or as mixtures.

Up to 10% by weight, of the polyethers may be replaced by other known higher molecular weight compounds (molecular weight from 800 to 10,000) which contain at least one, generally from 2 to 4 and preferably 2 to 3 isocyanate reactive hydrogen atoms, such as polyesters, polyamines, polythiols, polycarboxylic acids, polyacetals or polycarbonates. A certain proportion (up to a maximum of 50% by weight of the polyether) of polybutadienes which have OH groups and polyethers which have amino groups may also be used.

The quantity of polyethers (Component B) used according to the present invention is calculated so that the quantity of OH groups available from these polyethers amounts to from 0.015 to 0.04 equivalents, preferably from 0.02 to 0.035 equivalents per equivalent of NCO.

Other starting components used according to the present invention include low molecular weight dihydric alcohols which have molecular weights of from 62 to 200. Suitable dihydric alcohols include ethylene glycol, propylene glycol-(1,2) and -(1,3), butylene glycol-(1,4) and -(2,3), pentanediol-(1,5), hexanediol-(1,6), octanediol(1,8), neopentyl glycol, 1,4-bis-hydroxymethyl-cyclohexane, 2-methyl-1,3-propanediol, diethylene glycols which have a molecular weight of up to 200, dipropylene glycol, polypropylene glycols having a molecular weight of up to 200, dibutylene glycol and polybutylene glycols having a molecular weight of up to 200 and the like. The dihydric alcohols may, of course, be used as mixtures of several diols. These dihydric alcohols are used in a quantity calculated to provide from 0.2 to 0.4 and preferably from 0.25 to 0.35 equivalents of OH per equivalent of NCO.

According to the present invention, water and/or readily volatile inert organic substances are used as blowing agents. Suitable organic blowing agents include e.g. acetone; ethyl acetate; halogenated alkanes such as methylene chloride, chloroform, ethylidene chloride, vinylidene chloride, monofluorotrichloromethane or chlorodicluoromethane; butane; hexane; heptane; diethylether; and the like. Instead of using organic blowing agents, the effect of a blowing agent may be obtained by using water or by adding compounds which decompose at temperatures above room temperature to liberate gases, such as nitrogen, e.g. azo compounds, such as azoisobutyric acid nitrile. Other examples of blowing agents and details about the use of blowing agents may be found in Kunststoff-Handbuch, Volumn VII, published by Vieweg and Hochtlen, Carl-Hanser-Verlag, Munich 1966, pages 108 and 109, 453 to 455 and 507 to 510.

The organic blowing agents are generally used in quantities of from 2.5 to 12% by weight, preferably from 5 to 7%, based on the polyisocyanates.

Water is often used as additional blowing agent, together with the readily volatile organic substances, and at the same time it serves as chain lengthening agent for the polycondensation process. It is used in quantities of from 0.3 to 1%, by weight, preferably from 0.5 to 0.8%, by weight, based on the quantity of polyisocyanate.

The isocyanate trimerization catalysts used according to the present invention are known and have been described e.g. in British Pat. Nos. 809,809; 837,120; 856,372; 908,337; 1,104,394; 1,146,661; 1,184,893; 1,233,251; 1,217,097; 1,195,821 and 1,278,704.

Examples of suitable catalysts include strong bases, such as quaternary ammonium hydroxides, such as benzyl trimethylammonium hydroxide, alkali metal hydroxides, such as potassium hydroxide, and alkali metal alkoxides, such as sodium methoxide. Catalysts which have a weaker basic nature may also be used, e.g. alkali metal salts of carboxylic acids, such as sodium acetate, potassium acetate, potassium 2-ethylhexoate, potassium adipate and sodium benzoate, and certain tertiary amines, such as N-(2-dimethylaminoethyl)-N'-methyl piperazine and tris-(3-dimethylaminopropyl)-hexahydro-s-triazine.

Non-basic metal salts of carboxylic acids, such as lead octoate, for example, are also suitable catalysts.

The trimerization catalysts may be replaced to a small extent with a catalyst which catalyzes carbodiimide formation e.g. 3-alkylphospholine oxide.

Compounds which are not themselves capable of polymerizing isocyanates to any significant extent, but catalyze the reaction of isocyanates with compounds which have active hydrogen atoms are often used together with the above-mentioned catalysts. Compounds of this type include, for example, most of the aliphatic tertiary amines, e.g. 1,4-diaza-bicyclo(2,2,2)-octane and N,N-dimethyl benzylamine; certain organic metal compounds e.g. tin(II) octoate and dibutyl tin dilaurate; epoxides, such as propylene oxide, phenyl glycidyl ether and diglycidyl ethers of 2,2-bis(p-hydroxyphenyl)-propane.

Surface active additives (emulsifiers and foam stabilizers) may also be used according to the present invention. Suitable emulsifiers include, e.g. the soidum salts of ricinoleic sulphonates or of fatty acids or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

The foam stabilizers used are preferably watersoluble polyether siloxanes. These compounds generally have a polydimethylsiloxane group attached to a copolymer of ethylene oxide and propylene oxide. Foam stabilizers of this type have been described, for example in U.S. Pat. No. 2,764,565.

Known cell regulators, such as paraffins, fatty alcohols, dimethylpolysiloxanes or phenylmethyl polysiloxanes, can also be used according to the present invention. The cell size, i.e. the cell diameter, will most preferably be within the range of from 0.3 to 2.5mm, preferably from 0.5 to 2mm.

Other additives which may be used according to the present invention include reaction retarders, e.g. substances which are acid in reaction, such as hydrochloric acid or organic acid halides; pigments; dyes; known flame retarding agents, such as tris-chloroethylphosphate or ammonium phosphate or polyphosphate; stabilizers against ageing and weathering; plasticizers; fungistatic and bacteriostatic substances; and fillers, such as barium sulphate, kieselguhr and carbon black or whiting.

Other examples of surface active additives, foam stabilizers, cell regulators, reaction retarders, stabilizers, flame retarding substances, plasticizers, dyes, fillers and fungistatic and bacteriostatic substances which may be added according to the present invention and details concerning the use and mode of action of these additives may be found in Kunststoff-Handbuch, Volume VII, published by Vieweg and Hochtlen, Carl-Hanser-Verlag, Munich 1966, e.g. on pages 103 to 113.

The tough, rigid polyisocyanurate foams provided by the present invention may be produced by a discontinuous or continuous processes. Furthermore, they may be produced at room temperature or elevated temperatures. The components may be dosed and mixed by means of the conventional apparatus employed in the polyurethane industry. The individual components may be delivered separately and then mixed or alternatively a preliminary mixture containing some of the components or all the components, except the polyisocyanate, may first be prepared and then mixed with the polyisocyanate.

In order to obtain foam plastics with the most suitable properties, it is in some cases advantageous to carry out the foaming reaction in heated molds or on heated belts, and then to harden or temper the foams at an elevated temperature, for example at a temperature of about 80° C for 15 minutes.

The process may also be carried out continuously in the apparatus commonly used in polyurethane technology for producing foam block goods or laminated products.

When producing the foam products in the form of boards or sheets on a laminator, one or both sides of the board or sheet may be covered with a layer of thermoformable material which becomes attached by the foaming process, for example, non-woven, woven or knitted textile sheets, partially open celled sheets, such as polyurethane foams, cut polyethylene foam sheets, glass fiber fabrics or thermoplastic sheets, such as sheets for polyvinyl chloride.

Thermoforming may be carried out by known processes of bending, pressing or stamping. Foams produced in blocks may be first cut up into sheets or sheets produced by the laminator process may be used as such.

Heating of the foam plastics boards or sheets may be carried out, e.g. in hot air ovens, microwave and infrared heating channels, contact hot plates or combined heating installations.

Foams which react particularly favorably to the thermoforming process are those which according to ASTM D 1940 contain at least 20% and preferably from 20 to 90% of open cells. These foams undergo no distortion when heated and may therefore be heated in infra-red heating channels. The time required for heating the foams to the final temperature varies from about 10 seconds to 6 minutes, depending on the nature of the infra-red radiators and the thickness of the foams. The temperature required for thermoforming is in the region of from 150 to 210° C.

The thermoforming process may be carried out continuously or discontinuously. In the continuous process, the web of foam is heated in a heating section and then passed between rollers which may be heated and/or profiled.

The discontinuous process may be carried out by the known technique of stamping, using the conventional stamping dies made, e.g. of steel, aluminum or epoxide.

Thermoforming carried out by a continuous or discontinuous process may be used for producing parts in the form of boards or sheets. It is also possible to shape the articles by a process of stamping. The foams may be bent at right-angles or, if desired, the process may also be used for producing undercuts of several centimeters without tearing or breaking the foam. The stamped foam products may be produced in a wide variety of wall thicknesses, for example the wall thickness may change abruptly, e.g. from 45 mm to 1 mm, without damage to the material. Deep spherical impressions may also be produced, for example of the type which occur in cup shaped contours.

The thermoformable and thermoformed polyisocyanurate foams, optionally covered with reinforcements, protective surface layers and/or decorative facings, may be used where dimensionally stable, flame resistant, sound absorbing, shock absorbing, impact resistant, vibration resistant and/or thermoinsulating properties and/or deep spherical impressions or undercuts and/or wide variations in wall thickness are required.

The following are therefore suitable fields of application: interior cladding elements for vehicles (passenger cars, trucks, buses, special vehicles, railways, aircraft, ship), such as roof linings, side wall linings, protective coverings, facings for spars, hatracks, roof frame cushioning; shock absorbing elements in and on vehicles, such as facings for instrument panels, seat shells, the covering for the backrest of seats, arm rests and head supports; covering for technical instruments, such as sound instruments and automatic calculators; parts for technical instruments, such as loudspeaker membranes; surface coverings for tractor cabins, cable cars, elevators and telephone boxes; domestic articles, such as trays; articles for hobbies and leisure activities, such as ground surfaces for camping sites, billiard table coverings; interior linings for caravans; sealing rings and plates; decorative packaging goods, such as trays for coins; packaging materials, such as shells and containers; decorations, such as ceiling elements and wall elements; insulations for thermos flasks, pipes, pipe elbows and building elements; sound absorbing materials for walls, building elements and high speed machinery; sound damping materials for buildings; protective coverings for machines and motors; shock absorbing packaging material for delicate instruments; furniture parts, such as seat shells, upholstery, table tops, nursery furniture, door plates and panels, room dividers or screens; bathroom articles, such as lavatory seats; orthopaedic products, such as calipers and arm supports; cushioned articles for body protection, such as leg protectors; crash helmet linings; parts of shoes, such as insoles and arch supports; outer and inner surfaces for suitcases and bags; and parts of boats.

EXAMPLES

EXAMPLE 1

To produce a tough rigid polyisocyanurate foam, a component (B) consisting of:
100 parts, by weight of a polyether having a hydroxyl number of 56 contained by chemical addition of 55%, by weight, of ethylene oxide and 45% by weight, of propylene oxide to trimethylolpropane,
38 parts, by weight, of ethane-1,2-diol,
5.5 parts, by weight, of water,
1 part, by weight, of N,N',N''-tris-(dimethylaminopropyl)-hexahydro-s-triazine,
0.3 parts, by weight, of 2.5%, by weight, solution of potassium acetate in diethylene glycol,
1.5 parts, by weight, of permethylated diethylenetriamine,
0.8 parts, by weight, of a commercial polyether polysiloxane stabilizer and
0.04 parts, by weight, of phenylmethyl polysiloxane (cell regulator) is mixed with component (A) which is composed of:
780 parts, by weight, of diisocyanatodiphenylmethane consisting of 90%, by weight, of 4,4'-isomers and 10%, by weight, of 2,4'-isomers and modified with 14%, by weight, of tripropylene glycol (23%, by weight, isocyanate content) and,
50 parts, by weight, of monofluorotrichloromethane.

The two reactants (A) and (B) are subjected to vigorous mechanical mixing for 15 seconds. The foaming process sets in 25 seconds after the onset of mixing and the foam gels after a further 30 seconds. A foam which has a density of 40 kg/m³ and the following properties is obtained.

| | |
|---|---|
| Compressive strength according to DIN 53 421 | 0.3 MPa |
| Flexural resistance to heat according to | |

-continued

| | |
|---|---|
| DIN 53 424 | 135° C |
| Flexural strength according to DIN 53 423 | 0.4 MPa |
| Tensile strength according to DIN 53 455 | 0.4 MPa |
| Elongation at break according to DIN 53 455 | 17% |
| Proportion of open cells according to ASTM D 1940 | 20%. |

EXAMPLE 2

A tough rigid polyisocyanurate foam is produced by mixing a component (B) consisting of:
- 100 parts, by weight, of a polyether obtained by chemical addition of 55 percent, by weight, of ethylene oxide and 45 percent, by weight, of propylene oxide to trimethylolpropane, hydroxyl number 56,
- 45 parts, by weight, of ethane-1,2-diol,
- 5.8 parts, by weight, of water,
- 0.7 parts, by weight, of N,N',N''-tris-(dimethylaminopropyl)hexahydro-s-triazine,
- 1.3 parts, by weight, of permethylated diethylene triamine,
- 0.6 parts, by weight, of a commercial polyether polysiloxane stabilizer and
- 0.04 parts, by weight, of phenylmethylpolysiloxane (cell regulator) with component (A) which is composed of:
- 780 parts by weight, of 4,4'-diisocyanatodiphenylmethane modified with 14 percent, by weight, of tripropylene glycol and having an isocyanate content of 23%, by weight, and
- 50 parts, by weight, of monofluorotrichloromethane.

The foaming process sets in 30 seconds after the onset of mixing and the foam gels after a further 40 seconds. A foam having a density of 42 kg/m³ and the following properties is obtained:

| | |
|---|---|
| Compressive strength according to DIN 53 421 | 0.3 MPa |
| Flexural resistance to heat according to DIN 53 424 | 152° C |
| Flexural strength according to DIN 53 423 | 0.6 MPa |
| Tensile strength according to DIN 53 455 | 0.6 MPa |
| Elongation at break according to DIN 53 455 | 15% |
| Proportion of open cells according to ASTM D 1940 | 20%. |

EXAMPLE 3

A tough rigid polyisocyanurate foam is produced by mixing a component (B) consisting of:
- 100 parts, by weight, of polyether obtained by chemical addition of 55 percent, by weight, of ethylene oxide and 45 percent, by weight, of propylene oxide to trimethylolpropane, hydroxyl number 56,
- 45 parts, by weight, of ethane-1,2-diol,
- 5 parts, by weight, of N,N',N''-tris-(dimethylaminopropyl)-hexahydro-s-triazine,
- 1.5 parts, by weight, of permethylated diethylene triamine,
- 0.3 parts, by weight, of a commercial polyether polysiloxane stabilizer and
- 0.1 part, by weight, of phenylmethylpolysiloxane (cell regulator) with component (A) which is composed of:
- 780 parts, by weight, of 4,4'-diisocyanatodiphenylmethane modified with 14 percent, by weight, of tripropylene glycol and having an isocyanate content of 23%, by weight, and parts, by weight, of monofluorotrichloromethane.

The two components (A) and (B) are mixed for 15 seconds, using a laboratory stirrer. The foaming process sets in 30 seconds after the onset of mixing and the foam gels after a further 35 seconds. A foam having the following properties is obtained:

| | |
|---|---|
| Density according to DIN 53 420 | 80 kg/m³ |
| Flexural resistance to heat according to DIN 53 424 | 170° C |
| Compressive strength according to DIN 53 421 | 0.5 MPa |
| Flexural strength according to DIN 53 423 | 0.96 MPa |
| Tensile strength according to DIN 53 455 | 0.5 MPa |
| Elongation at break according to DIN 53 455 | 10% and |
| Proportion of open cells according to ASTM D 1940 | 20%. |

EXAMPLE 4

A tough rigid polyisocyanurate foam is produced by mixing a component (B) consisting of:
- 100 parts, by weight, of polyether obtained by chemical addition of 55 percent, by weight, of ethylene oxide and 45 percent, by weight, of propylene oxide to trimethylolpropane, hydroxyl number 56,
- 20 parts, by weight, of ethane -1,2-diol,
- 2.2 parts, by weight, of water,
- 0.7 parts, by weight, of a solution composed of 25 parts, by weight, of potassium acetate and 75 parts, by weight, of diethylene glycol,
- 0.2 parts, by weight, of a commercial polyether polysiloxane stabilizer
- 0.8 parts, by weight of permethylated diethylene triamine, and
- 0.04 parts, by weight, of phenyl methyl polysiloxane (cell regulator) with component (A) which is composed of:
- 400 parts, by weight, of a diisocyanatodiphenylmethane consisting of 60%, by weight, of 2,4'-isomer and 40%, by weight, of 4,4'-isomer and having an isocyanate content of 31.5% by weight and
- 26 parts, by weight, of monofluorotrichloromethane.

Mixing the two components (A) and (B) by means of a laboratory stirrer takes 15 seconds. The foaming process sets in at 30 seconds from the onset of mixing and the foam gels after a further 35 seconds.

A foam having the following properties is obtained:

| | |
|---|---|
| Density according to DIN 53 420 | 40 kg/m³ |
| Flexural resistance to heat according to DIN 53 424 | 165° C |
| Compressive strength according to DIN 53 421 | 0.2 MPa |
| Flexural resistance according to DIN 52 423 | 0.3 MPa |
| Tensile strength according to DIN 53 455 | 0.25 MPa |
| Elongation at break according to DIN 53 455 | 15% and |
| Proportion of open cells according to ASTM D 1940 | 80%. |

EXAMPLE 5

A tough rigid polyisocyanurate foam is produced by mixing a component (A) consisting of:
- 100 parts, by weight of a polyether obtained by chemical addition of 55%, by weight, of ethylene oxide and 45%, by weight, of propylene oxide to trimethylolpropane, hydroxyl number 56,
- 38 parts, by weight, of ethane-1,2-diol,
- 4 parts, by weight, of water,
- 4.5 parts, by weight, of a solution composed of 25 parts, by weight, of potassium acetate and 75 parts, by weight, of diethylene glycol,
- 1.6 parts, by weight, of permethylated diethylene triamine,
- 0.8 parts, by weight, of a commercial polyether polysiloxane stabilizer, and 0.02 parts, by weight, of phenyl methyl polysiloxane (cell regulator with component (B) which is composed of:

700 parts, by weight, of a mixture of 50 percent, by weight, of a polymethylene polyphenyl polyisocyanate which has a diisocyanatodiphenylmethane content of 60 percent, by weight, and 50 percent, by weight, of a diisocyanatodiphenylmethane which has been modified with 5 percent, by weight, of tripropylene glycol, the mixture having an isocyanate content of 27%, by weight, and 50 percent, by weight, of monofluorotrichloromethane.

Mixing the two components (A) and (B) by means of a laboratory stirrer takes 15 seconds. The foaming process sets in 30 seconds after the onset of the mixing process and the foam gels after a further 35 seconds. A foam having the following properties is obtained:

| | |
|---|---|
| Density according to DIN 53 420 | 40 kg/m³ |
| Flexural resistance to heat according to DIN 53 424 | 165° C |
| Compressive strength according to DIN 53 421 | 0.3 MPa |
| Flexural strength according to DIN 53 423 and | 0.35 MPa |
| Porportion of open cells according to ASTM D 1940 | 70%. |

What is claimed is:

1. In a process for the production of thermoformable polyisocyanurate foams by reaction of compounds which have hydroxyl groups with an excess of polyisocyanates in the presence of isocyanate trimerization catalysts, and blowing agents, the improvement which comprises reacting a polymethylene polyphenyl polyisocyanate which contains at least 80% by weight of diisocyanatodiphenylmethane and a mixture of
   (a) polyethers containing at least one hydroxyl group and having an OH number of from 28 to 112, in which at least 20% by weight of the alkylene oxide component consists of ethylene oxide groups, and
   (b) dihydric alcohols which have a molecular weight of from 62 to 200,
said polyethers being used in a quantity corresponding to from 0.015 to 0.04 equivalents of OH per equivalent NCO and the dihydric alcohols being used in a quantity corresponding to from 0.2 to 0.4 equivalents of OH per equivalent of NCO.

2. The process of claim 1, characterized in that the polymethylene polyphenyl polyisocyanate contains from 5 to 60% by weight, of 2,4′-diisocyanatodiphenylmethane.

3. The process of claim 1, characterized in that at least 10%, by weight, of the hydroxyl groups in said polyether are primary hydroxyl groups.

4. The process of claim 1 wherein 30 to 50% of the alkylene oxide component consists of ethylene oxide.

5. Thermoformable polyisocyanurate foams obtainable by the process according to claim 1.

* * * * *